US005720800A

United States Patent [19]

Matsumoto

[11] Patent Number: 5,720,800

[45] Date of Patent: Feb. 24, 1998

[54] FOUNTAIN SOLUTION FOR LITHOGRAPHIC PRINTING

[75] Inventor: Hiroshi Matsumoto, Shizuoka, Japan

[73] Assignee: Fuji Photo Film Co., Ltd., Minami-Ashigara, Japan

[21] Appl. No.: 659,582

[22] Filed: Jun. 6, 1996

[30] Foreign Application Priority Data

Jun. 14, 1995 [JP] Japan ........................ 7-147625

[51] Int. Cl.$^6$ ........................ C09K 3/18

[52] U.S. Cl. ........................ 106/2; 101/451

[58] Field of Search ........................ 106/2; 101/451

[56] References Cited

U.S. PATENT DOCUMENTS

| | | | |
|---|---|---|---|
| 4,278,467 | 7/1981 | Fadner | 106/2 |
| 5,164,000 | 11/1992 | Gamblin | 106/2 |

FOREIGN PATENT DOCUMENTS 5-221179 8/1993 Japan .

*Primary Examiner*—Helene Klemanski

*Attorney, Agent, or Firm*—Burns, Doane, Swecker & Mathis, LLP

[57] ABSTRACT

A fountain solution for lithographic printing is disclosed, which comprises a butylene oxide adduct of alcohol and a pH buffer.

4 Claims, No Drawings

FOUNTAIN SOLUTION FOR LITHOGRAPHIC PRINTING

FIELD OF THE INVENTION

The present invention relates to a fountain solution composition useful for an offset printing method using a lithographic printing plate.

BACKGROUND OF THE INVENTION

Lithographic printing is a printing method ingeniously utilizing the substantial immiscibility of water and oil. The printing plate comprises two areas: one is a non-image area which receives water and repels oily ink, and the other is an area which repels water and receives oily ink. The surface chemical difference between the image area and the non-image area is enlarged by dampening of the non-image area with a fountain solution containing a desensitizer. As a result, the ink non-receptivity (repellency) of the non-image area and the ink receptivity of the image area are increased.

Examples of conventionally known desensitizers include aqueous solutions containing colloidal materials such as alkali metal or ammonium salts of bichromic acid, phosphoric acid or salts thereof, e.g., ammonium salts, gum arabic and carboxymethyl cellulose (CMC). However, these fountain solutions have a drawback such that the non-image area of the printing plate is difficult to be dampened uniformly. Therefore, printed matters are sometimes smeared, and considerable skilled art is required to adjust the feeding rate of the fountain solutions.

For improvement of these disadvantages, a Dahlgren method in which an aqueous solution containing about 20 to 25% of isopropyl alcohol is used as a fountain solution has been proposed and now widely used. Various advantages can be obtained according to this method in working conditions and the accuracy of the obtained printed matters, such that wetting of non-image areas is improved, the amount of fountain solution is reduced, the feeding balance of printing ink and fountain solution is easily adjusted, the emulsification amount of a fountain solution into printing ink substantially reduced, and the transferability of printing ink to a blanket is improved.

However, since the evaporation rate of isopropyl alcohol is different from that of water, a special and expensive device is necessary to maintain the uniform concentration of isopropyl alcohol in a fountain solution. Furthermore, isopropyl alcohol has a peculiar malodor. In addition, since there is a problem in toxicity, it is regulated by the organic solvent poisoning preventing regulation of the Japanese labor safety and hygiene law. Moreover, since isopropyl alcohol is an inflammable compound, it comes under dangerous substances of the fire protection law. Accordingly, care must be taken in handling, storage and management, and it is not preferred from working conditions. Also, there is another problem such that when the fountain solution added with isopropyl alcohol is applied to offset printing which uses a conventional dampening roller, the effect of the fountain solution cannot be exhibited because isopropyl alcohol evaporates on a roller and a printing plate.

Consequently, a fountain solution free of isopropyl alcohol has been desired. For achieving these objects, compositions containing various surfactants are disclosed, for example, in JP-B-55-25075, JP-B-55-19757 and JP-B-58-5797 (the term "JP-B" as used herein means an "examined Japanese patent publication"). However, when these compositions are used in fountain solutions, they are not sufficient to completely resolve problems such that water adheres to the surface layer of ink, and ink is diffused on the surface of water because ink and water are more vigorously agitated at an ink roller rotating at high speed, a printing plate and a fountain solution-feeding roll. Moreover, fountain solutions containing these surfactants have a defect of being liable to foam during pumping and stirring.

Furthermore, U.S. Pat. No. 3,877,372 discloses a fountain solution containing a mixture of ethylene glycol monobutyl ether with at least one of hexylene glycol and ethylene glycol. U.S. Pat. No. 4,278,467 discloses a fountain solution containing at least one of n-hexoxy diethylene glycol, n-hexoxy ethylene glycol, 2-ethyl-1,3-hexanediol, n-butoxy ethylene glycol acetate, n-butoxy diethylene glycol acetate, and 3-butoxy-2-propanol. JP-A-57-199693 discloses a fountain solution containing 2-ethyl-1,3-hexanediol and at least one of completely water-soluble propylene glycol, ethylene glycol, dipropylene glycol, diethylene glycol, hexylene glycol, triethylene glycol, tetraethylene glycol, tripropane glycol, and 1,5-pentanediol (the term "JP-A" as used herein means an "unexamined published Japanese patent application"). These compositions for fountain solutions are advantageous from the point of safety and hygiene because of being free of isopropyl alcohol. However, there are problems such that wetting of a non-image area is not sufficient during printing by a lithographic printing plate comprising a support of anodized aluminum plate, the non-image area is scummed at high speed printing, or the formation of a dot image area becomes large or uneven, that is, the so-called spreading of a dot image area is generated. Moreover, since the solubility of 2-ethyl-1,3-hexanediol in water is not sufficient, there is a disadvantage that a composition for a highly concentrated fountain solution cannot be easily obtained.

In addition, fountain solutions containing propylene oxide adducts of polyhydric alcohols, such as propylene oxide adducts of glycerin, sorbitol, and 3-methylpentane-1,3,5-triol, are disclosed in JP-A-5-221179. These fountain solutions alone do not have a long run printability of 10,000 sheets or more. Accordingly, since it is necessary to use a volatile organic solvent in combination, such as tetrapropylene glycol monomethyl ether, 3-methyl-2-methoxybutanol, or methyl carbitol, they may not be said to be complete from the standpoints of being safe and hygienic.

Additionally, these substitute compounds for isopropyl alcohol are generally high boiling point solvents and have a drawback such that when water evaporates, high boiling point organic solvents remain and invade an image area of a lithographic printing plate.

SUMMARY OF THE INVENTION

Accordingly, an object of the present invention is to provide a fountain solution for lithographic printing which is free of the toxicity and defects of the above conventional fountain solutions, requires no skilled art in printing work, and substitutes for isopropyl alcohol completely in every constitution of printing machine. By this fountain solution, generation of problems at printing, such as scumming of a printing plate, in particular, scumming of a printing plate using a support of an aluminum plate electrochemically surface roughened and anodized, blinding and water log, is inhibited. Furthermore, the fountain solution is compatible with other compositions of fountain solutions without impairing an image area of a printing plate. In addition, the fountain solution can be highly concentrated, and is free of problems of safety, hygiene and fire protection. As a result, high quality printed matters can be easily provided by using the fountain solution.

As a result of eager studies for achieving the above object, the present inventor has found that the compound for use in the present invention is almost odorless, therefore, preferred for improving printing working conditions, and that the above object can be resolved using the compound. Thus, the present inventor has developed the following fountain solution for lithographic printing.

That is, this and other objects of the present invention have been achieved by a fountain solution for lithographic printing fountain solution, which comprises a butylene oxide adduct of alcohol and a pH buffer.

DETAILED DESCRIPTION OF THE INVENTION

Examples of the alcohol for use in the composition for a lithographic printing fountain solution (hereinafter often referred to as a fountain solution composition) of the present invention include monohydric alcohol (e.g., methyl alcohol, ethyl alcohol, n-propyl alcohol, isopropyl alcohol, butyl alcohol, tetrahydrofurfuryl alcohol), dihydric alcohol (e.g., ethylene glycol, diethylene glycol, triethylene glycol, propylene glycol, dipropylene glycol, tripropylene glycol), polyhydric alcohol (e.g., glycerin, diglycerin, triglycerin, polyglycerin, trimethylolethane, trimethylolpropane, 3-methylpentane-1,3,5-triol, pentaerythritol), and monosaccharide or polysaccharide (e.g., sorbitol, mannitol).

The addition amount of butylene oxide to the above alcohol is preferably 20 mol or less, more preferably 10 mol per or less, per mol of an —OH group in the alcohol. If it exceeds 20 mol, the solubility in water is deteriorated so that the desired objects cannot be obtained. The preferable lower limit thereof is 1 mol per mol of an —OH group in the alcohol.

An aqueous solution of the above compound having the dynamic surface tension of 35 to 50 dyn/cm, which is a suitable range for a fountain solution, can be easily obtained by adjusting the addition mol number of butylene oxide to obtain a 0.01 to 1 wt %, preferably 0.03 to 0.8 wt %, aqueous solution.

The butylene oxide adduct of the alcohol for use in the present invention may be an adduct of butylene oxide alone to the above alcohols, or a copolymer adduct of butylene oxide with ethylene oxide and/or propylene oxide (a block copolymer or a random copolymer).

The compound which is suitable for a fountain solution can be prepared by adjusting the solubility in water using a block or random copolymer adduct of butylene oxide with ethylene oxide and/or propylene oxide, if needed.

The butylene oxide adduct of the alcohol for use in the present invention can be produced by, for example, dissolving an alkali catalyst in alcohol and adding butylene oxide thereto.

The pH buffer in the fountain solution composition includes water-soluble organic acid and/or inorganic acid or salts thereof.

These compounds have effects on adjusting or buffering of the pH of the fountain solution and appropriate etching or prevention of corrosion of the support in the lithographic printing plate. Examples of the organic acid include citric acid, ascorbic acid, malic acid, tartaric acid, lactic acid, acetic acid, gluconic acid, hydroxyacetic acid, oxalic acid, malonic acid, levulinic acid, sulfanilic acid, p-toluenesulfonic acid, phytic acid, and organic phosphonic acid. Examples of the inorganic acid include phosphoric acid, nitric acid, sulfuric acid, and polyphosphoric acid. Furthermore, alkali metal salts, alkaline earth metal salts, ammonium salts, and organic amine salts of these organic acids and/or inorganic acids can be preferably used. These organic acids, inorganic acids and/or salts thereof may be used alone or as mixtures of two or more.

The addition amount of these compounds to the fountain solution composition of the present invention is preferably from 0.001 to 5 wt %, and more preferably from 0.005 to 3 wt %. The pH of the fountain solution composition is preferably adjusted to a range of 3 to 7 by these compounds. On the other hand, the fountain solution composition may be used in an alkaline region of 7 to 11 by using an alkali metal hydroxide, phosphoric acid, an alkali metal salt, an alkali metal carbonate, or a silicate.

The fountain solution of the present invention can be supplied to the non-image area on the printing plate as uniform water screen because the dynamic surface tension is low and, particularly, the wettability of a chrome roller and a rubber roller by a fountain solution feeder of continuous feeding system is good. Furthermore, the fountain solution of the present invention is less in problematic foaming incidental to surfactants and is, therefore, excellent in printing stability. Moreover, they may be used in combination of two or more thereof.

In addition to the above adducts, the following compounds can be used in the present invention, if needed, for adjusting dynamic surface tension, solubility, or contamination rate (emulsification rate) of printing ink in an appropriate range.

Specific examples thereof include ethylene glycol monomethyl ether, diethylene glycol monomethyl ether, triethylene glycol monomethyl ether, polyethylene glycol monomethyl ether, ethylene glycol monoethyl ether, diethylene glycol monoethyl ether, triethylene glycol monoethyl ether, ethylene glycol monobutyl ether, diethylene glycol monobutyl ether, triethylene glycol monobutyl ether, ethylene glycol monoisobutyl ether, diethylene glycol monoisobutyl ether, triethylene glycol monoisobutyl ether, ethylene glycol monopropyl ether, diethylene glycol monopropyl ether, triethylene glycol monopropyl ether, ethylene glycol mono-t-butyl ether, diethylene glycol mono-t-butyl ether, triethylene glycol mono-t-butyl ether, ethylene glycol monohexyl ether, diethylene glycol monohexyl ether, triethylene glycol monohexyl ether, ethylene glycol monophenyl ether, diethylene glycol monophenyl ether, triethylene glycol monophenyl ether, propylene glycol, dipropylene glycol, tripropylene glycol, tetrapropylene glycol, propylene glycol monomethyl ether, dipropylene glycol monomethyl ether, tripropylene glycol monomethyl ether, propylene glycol monoethyl ether, dipropylene glycol monoethyl ether, tripropylene glycol monoethyl ether, tetrapropylene glycol monoethyl ether, propylene glycol monopropyl ether, dipropylene glycol monopropyl ether, tripropylene glycol monopropyl ether, propylene glycol monoisopropyl ether, dipropylene glycol monoisopropyl ether, tripropylene glycol monoisopropyl ether, propylene glycol monobutyl ether, dipropylene glycol monobutyl ether, tripropylene glycol monobutyl ether, propylene glycol monoisobutyl ether, dipropylene glycol monoisobutyl ether, tripropylene glycol monoisobutyl ether, propylene glycol mono-t-butyl ether, dipropylene glycol mono-t-butyl ether, and tripropylene glycol mono-t-butyl ether; polypropylene glycol having a molecular weight of 200 to 1,000 and monomethyl ether, monoethyl ether, monopropyl ether, isopropyl ether, monobutyl ether, and 2-ethyl-1,3-hexanediol thereof; an ethylene oxide and/or propylene oxide adduct of 2-ethyl-1,3-hexanediol; an ethylene oxide and/or propylene oxide adduct of acetylene alcohol or acetylene glycol; a propylene oxide adduct of trimethylolpropane; a propylene oxide adduct of glycerin; a propylene oxide adduct of sorbitol; and 3-methyl-3-methoxybutanol, methoxybutanol, and tetrahydrofurfuryl alcohol.

Of these compounds, effective compounds as a dynamic surface tension assistant are 2-ethylhexanediol, an ethylene oxide adduct of acetylene glycol, ethylene glycol monobutyl ether, propylene glycol monobutyl ether, dipropylene glycol monobutyl ether, and polypropylene glycol monoalkyl ($C_1$ to $C_4$) ether having an average addition mol number of 2 to 10.

As a solubilizer, ethylene glycol mono-t-butyl ether, 3-methyl-3-methoxybutanol, 3-methoxybutanol, and tetrahydrofurfuryl alcohol are preferably used.

As an ink emulsifying agent, an ethylene oxide adduct of 2-ethyl-1,3-hexanediol and an ethylene oxide adduct of trimethylolpropane are preferably used.

These compounds may be used alone or in combination of two or more, and are preferably used in an amount of 0.01 to 7 wt %, and more preferably 0.05 to 5 wt %.

The fountain solution of the present invention may further contain (a) a water-soluble high molecular compound (polymer), (b) a surfactant, (c) a chelating compound, (d) a preservative, (e) a rust preventive, (f) a colorant, (g) a perfume, and (h) a defoaming agent, if needed.

Examples of (a) water-soluble high molecular compounds for use in the present invention include natural materials and modified products thereof such as gum arabic, starch derivatives (e.g., dextrin, enzyme-decomposed dextrin, hydroxypropylated enzyme-decomposed dextrin, carboxymethylated starch, phosphoric acid starch, octenyl succinated starch), alginate, and cellulose derivatives (e.g., carboxymethyl cellulose, carboxyethyl cellulose, methyl cellulose), and synthetic compounds such as polyethylene glycol and copolymers thereof, polyvinyl alcohol and derivatives thereof, polyvinyl pyrrolidone, polyacrylamide and copolymers thereof, polyacrylic acid and copolymers thereof, vinyl methyl ether/maleic anhydride copolymers, vinyl acetate/maleic anhydride copolymers, and polystyrenesulfonic acid and copolymers thereof.

The water-soluble high molecular compound is preferably used in an amount of 0.0001 to 0.1 wt %, more preferably from 0.0005 to 0.05 wt %, based on the fountain solution composition.

The surfactant (b) for use in the present invention may be added as an assistant of a solubilizing wetting agent.

Examples of anionic surfactants for use in the present invention include fatty acid salts, abietic acid salts, hydroxyalkanesulfonates, alkanesulfonates, dialkylsulfosuccinates, straight chain alkylbenzenesulfonates, branched chain alkylbenzenesulfonates, alkylnaphthalenesulfonates, alkylphenoxypolyoxyethylenepropylsulfonates, polyoxyethylenealkylsulphenyl ethers, sodium N-methyl-N-oleyltaurines, disodium N-alkylsulfosuccinic acid monoamides, petroleum sulfonates, sulfated castor oil, sulfated beef tallow oil, sulfates of fatty acid alkyl esters, alkylsulfates, polyoxyethylenealkyl ether sulfates, fatty acid monoglyceride sulfates, polyoxyethylenealkylphenyl ether sulfates, polyoxyethylenestyrylphenyl ether sulfates, alkylphosphates, polyoxyethylenealkyl ether phosphates, polyoxyethylenealkylphenyl ether phosphates, partially saponified products of styrene/maleic anhydride copolymer, partially saponified products of olefin/maleic anhydride copolymer, and formalin condensation products of naphthalenesulfonate. Of these, dialkylsulfosuccinates, alkylsulfates and alkylnaphthalenesulfonates are preferably used.

Examples of nonionic surfactants for use in the present invention include polyoxyethylene alkyl ethers, polyoxyethylenealkylphenyl ethers, polyoxyethylenepolystyrylphenyl ethers, polyoxyethylenepolyoxypropylenealkyl ethers, glycerin fatty acid partial esters, sorbitan fatty acid partial esters, pentaerythritol fatty acid partial esters, propylene glycol monofatty acid esters, sucrose fatty acid partial esters, polyoxyethylenesorbitan fatty acid partial esters, polyoxyethylenesorbitol fatty acid partial esters, polyethylene glycol fatty acid esters, polyglycerin fatty acid partial esters, polyoxyethylenated castor oils, polyoxyethylene glycerin fatty acid partial esters, fatty acid diethanolamides, N,N-bis-2-hydroxyalkylamines, polyoxyethylenealkylamines, triethanolamine fatty acid esters, and trialkylamine oxides. In addition to the above, fluorine surfactants and silicon surfactants can also be used. Of these, polyoxyethylenealkylphenyl ethers, polyoxyethylene/polyoxypropylene block polymers are preferably used.

Furthermore, silicon derivatives or fluorine derivatives can also be used as surfactants. These surfactants are preferably used in an amount of 1.0 wt % or less, preferably from 0.001 to 0.5 wt %, based on the fountain solution composition when the foaming is considered. They can be used in combination of two or more.

In the present invention, the chelating compound (c) can be added.

In general, a concentrated composition of the fountain solution can be used by diluting with tap water or well water. At this time, calcium ions or the like contained in city water or well water sometimes adversely affect printing and causes for printed matters to be liable to be scummed. However, such a defect can be prevented by adding a chelating compound. Examples of preferred chelating compounds include organic phosphonic acids and phosphonoalkanetricarboxylic acids, such as ethylenediaminetetraacetic acid, a potassium salt thereof, a sodium salt thereof; diethylenetriaminepentaacetic acid, a potassium salt thereof, a sodium salt thereof; triethylenetetraminehexaacetic acid, a potassium salt thereof, a sodium salt thereof; hydroxyethylethylenediaminetriacetic acid, a potassium salt thereof, a sodium salt thereof; nitrilotriacetic acid, a potassium salt thereof, a sodium salt thereof; 1-hydroxyethane-1,1-diphosphonic acid, a potassium salt thereof, a sodium salt thereof; and aminotri(methylenephosphonic acid), a potassium salt thereof, a sodium salt thereof. In place of the sodium salts and potassium salts of the above chelating compounds, organic amine salts can also be effectively used. These chelating compounds are selected from those stably present in the composition of the fountain solution and do not hinder the printability. The chelating compounds are preferably used in an amount of 0.0001 to 1.0 wt %, preferably from 0.0005 to 0.1 wt %, based on the fountain solution compound.

Examples of (d) preservatives for use in the present invention include phenol or derivatives thereof, formalin, imidazole derivatives, sodium dehydroacetate, 4-isothiazolin-3-one derivatives, benzotriazole derivatives, derivatives of amidine and guanidine, quaternary ammonium salts, derivatives of pyridine, quinoline and guanidine, derivatives of diazine and triazole, derivatives of oxazole and oxazine, bromonitropropanol, 1,1-dibromo-1-nitro-2-ethanol, and 3-bromo-3-nitropentane-2,4-diol. The preferred addition amount is a sufficient amount to exhibit effects to bacteria, fungus and yeast; therefore, the amount depends on the kinds of bacteria, fungus and yeast. However, the preservatives are preferably used in an amount of 0.001 to 1.0 wt % based on the fountain solution composition. Two or more of the preservatives are preferably used in combination so as to be effective to various kinds of fungus, bacteria and yeast.

Examples of (e) rust preventives for use in the present invention include benzotriazole, 5-methylbenzotriazole, thiosalicylic acid, benzimidazole, and derivatives thereof.

Examples of (f) colorants for use in the present invention include food dyes such as yellow dyes (e.g., CI Nos. 19140, 15985), red dyes (e.g., CI Nos. 16185, 45430, 16255, 45380, 45100), violet dyes (e.g., CI No. 42640), blue dyes (e.g., CI Nos. 42090, 73015), and green dyes (e.g., CI No. 42095).

A trace amount of (g) perfume is preferably used for improving the working environment of printing. Examples thereof for masking odors of solvents include perfumes of fragrant olive, lemon, and vanillin. Thus, the fountain solution becomes further easy to use.

Preferable examples of (h) defoaming agents for use in the present invention include a silicone defoaming agent. The silicone defoaming agent may be an emulsified dispersion type or a soluble type.

Generally, the fountain solution of the present invention is previously concentrated and is diluted with tap water or well water to from 30 to 500 times when it is used.

By using the fountain solution of the present invention, scumming of background and scumming by oxidation can be prevented, printing can be conducted with a small amount of the solution, and good printed matters can be obtained. As a result, efficiency can be increased and productivity can be improved. In particular, the fountain solution of the present invention is used in printing machines of continuous water feeding system represented by a Dahlgren method, good printed matters can be obtained without using isopropyl alcohol. In addition, if needed, when 1 to 15 wt % of isopropyl alcohol is used in the fountain solution in combination, there is no problem in printing quality.

The fountain solution composition of the present invention can be used in every printing machine of continuous water feeding system as a substitute for isopropyl alcohol containing fountain solutions conventionally used, and exhibits excellent printability. Furthermore, the composition of the present invention can be highly concentrated, and is free of problems of safety of labor, safety of fire protection, and high quality printed matters can be stably obtained.

The present invention will be explained in detail by reference to the following Examples and Comparative Examples, but the invention should not be construed as being limited thereto. All percents, parts, ratios and the like are by weight unless otherwise indicated.

EXAMPLES

Examples 1 to 5 and Comparative Examples 6 to 8

Compositions of the fountain solution each having a composition shown in Table 2 were prepared using butylene oxide adducts of alcohols of the present invention shown in Table 1. In Table 2, unit is gram and each composition was made 1,000 ml by adding water.

TABLE 1

| | Compound |
|---|---|
| A | Adduct comprising a random copolymer of 2 mol of butylene oxide and 1 mol of ethylene oxide added to triethylene glycol |
| B | Adduct comprising a block copolymer of 2 mol of butylene oxide and 2 mol of ethylene oxide added to trimethylolpropane |
| C | Adduct comprising 2 mol of butylene oxide added to glycerin |
| D | Adduct comprising a block copolymer of 3 mol of butylene oxide and 2 mol of ethylene oxide added to sorbitol |
| E | Adduct comprising a random copolymer of 2 mol of butylene oxide and 2 mol of ethylene oxide added to sorbitol |
| F | Adduct comprising a random copolymer of 2 mol of propylene oxide and 2 mol of ethylene oxide added to sorbitol |

TABLE 2

| | Invention | | | | | Comparison | | |
|---|---|---|---|---|---|---|---|---|
| | 1 | 2 | 3 | 4 | 5 | 6 | 7 | 8 |
| Wettability improving agent | | | | | | | | |
| A | 270 | — | — | — | — | — | — | — |
| B | — | 270 | — | — | — | — | — | — |
| C | — | — | 300 | — | — | — | — | — |
| D | — | — | — | 300 | — | — | — | — |
| E | — | — | — | — | 300 | — | — | — |
| F | — | — | — | — | — | — | — | 300 |
| Propylene glycol monobutyl ether | — | — | — | — | — | 120 | — | — |
| Ethylene glycol monobutyl ether | — | — | — | — | — | 150 | 300 | — |
| Solubilizing agent | | | | | | | | |
| 3-Methyl-3-methoxybutanol | 100 | — | — | 59 | — | 199 | — | — |
| Ethylene glycol mono-t-butyl ether | — | 100 | — | 50 | 50 | — | 100 | 50 |
| Tetrahydrofurfuryl alcohol | — | — | 100 | — | 50 | — | — | 50 |
| pH Buffer | | | | | | | | |
| Citric acid primary ammonium | 25 | 25 | 25 | 25 | 25 | 25 | 25 | 25 |
| Citric acid (85%) | 10 | 10 | 10 | 10 | 10 | 10 | 10 | 10 |

TABLE 2-continued

| | Invention | | | | | Comparison | | |
|---|---|---|---|---|---|---|---|---|
| | 1 | 2 | 3 | 4 | 5 | 6 | 7 | 8 |
| Nitrate | | | | | | | | |
| Ammonium nitrate | 10 | 10 | 10 | 10 | 10 | 10 | 10 | 10 |
| Magnesium nitrate | 10 | 10 | 10 | 10 | 10 | 10 | 10 | 10 |
| Corrosion preventive | | | | | | | | |
| Benzotriazole | 0.1 | — | 0.1 | — | 0.1 | 0.1 | — | 0.1 |
| Thiosalicylic acid | — | 0.1 | — | 0.1 | — | — | 0.1 | — |
| Water-soluble high molecular compound | | | | | | | | |
| Hydroxypropyl cellulose | 4 | 4 | — | — | 2 | 4 | — | 2 |
| PVA/maleic anhydride copolymer | — | — | 4 | 4 | 2 | — | 4 | 2 |
| Surfactant | | | | | | | | |
| Pluronic L-31 (oxyethylene/oxypropylene block copolymer) | 30 | 30 | — | — | — | 30 | — | — |
| Preservative | | | | | | | | |
| 4-Isothiazolin-3-one derivative | 2 | 2 | 1 | 1 | 1 | 2 | 1 | 1 |
| 1,1-Dibromo-1-nitro-2-ethanol | — | — | 1 | 1 | 1 | — | 1 | 1 |
| Pure water to make | ----1,000 ml---- | | | | | | | |

pH was adjusted to 5.0 to 5.2 with a 2% diluting solution

Each of the thus-prepared fountain solutions in Examples 1 to 5 and Comparative Examples 6 to 8 was diluted to concentrations of 1%, 2% and 3%, and printing tests were conducted using the printing machine equipped with Dia water feeder of Mitsubishi Printing Machine Co., Ltd., High Plus MZ Cyan Ink manufactured by Toyo Ink Manufacturing Co., Ltd., and VSP printing plate engraved according to standard conditions manufactured by Fuji Photo Film Co., Ltd. The results of evaluations are shown in Table 3.

Each test in Table 3 was conducted as follows.

a) Contamination of metering roll:

Degree of contamination by adhesion of ink to the metering roll for water supply was examined.

Good: A

Fine: B poor: C b) Continuous stability:

Using pure water as a fountain solution, 10,000 sheets were printed and the amount of the fountain solution not contaminated (minimum amount of water supply) was determined, printing was carried out using each fountain solution in the same amount with this minimum amount of water supply. Evaluation was performed by the number of the prints until scumming of the printed matters was generated for the first time.

10,000 or more: A 10,000 to 3,000: B c) Rib mark suitability (easiness of occurrence of streaks such as rainy state)

States of the solid part and the plain halftone part were observed at printing speed of 10,000 rph and 5,000 rph.

Good: A

Fine: B poor: C d) Environment of a printing room (odors)

Good: A

Fine: B

Poor: C

The fountain solutions of the present invention were excellent in each of items (a) to (d) and good printed matters were obtained.

TABLE 3

| | Concentration (%) | Invention 1 | 2 | 3 | 4 | 5 | Comparison 6 | 7 | 8 |
|---|---|---|---|---|---|---|---|---|---|
| a) Contamination of metering roll | 1 | A | A | A | A | A | B | B | C |
| | 2 | A | A | A | A | A | A | A | C |
| | 3 | A | A | A | A | A | A | A | B |
| b) Continuous stability | 1 | A | A | A | A | A | B | C | C |
| | 2 | A | A | A | A | A | A | B | B |
| | 3 | A | A | A | A | A | A | A | B |
| c) Rib mark suitability | 1 | B | A | A | A | A | C | C | C |
| | 2 | A | A | A | A | A | B | C | C |
| | 3 | A | A | A | A | A | A | A–B | C |
| d) Environment of printing room | 1 | A | A | A | A | A | B | A | A |
| | 2 | A | A | A | A | A | B | B | A |
| | 3 | A | A | A | A | A | C | C | A |

The fountain solutions of the present invention were excellent in each of items (a) to (d) and printing suitability and good printed matters were obtained with a small amount of the solution.

Furthermore, suitability of a fountain solution was also excellent.

While the invention has been described in detail and with reference to specific examples thereof, it will be apparent to one skilled in the art that various changes and modifications can be made therein without departing from the spirit and scope thereof.

What is claimed is:

1. A fountain solution for lithographic printing, which comprises a butylene oxide adduct of alcohol and a pH buffer.

2. The fountain solution as claimed in claim 1, wherein the alcohol is selected from the group consisting of methyl alcohol, ethyl alcohol, n-propyl alcohol, isopropyl alcohol, butyl alcohol, tetrahydrofurfuryl alcohol, ethylene glycol, diethylene glycol, triethylene glycol, propylene glycol, dipropylene glycol, tripropylene glycol, glycerin, diglycerin, triglycerin, polyglycerin, trimethylolethane, trimethylolpropane, 3-methylpentane-1,3,5-triol, pentaerythritol, sorbitol, and mannitol.

3. The fountain solution as claimed in claim 1, wherein the butylene oxide is added in an amount of 20 mol or less per mol of an —OH group in the alcohol.

4. The fountain solution as claimed in claim 1, wherein the pH buffer is selected from the group consisting of citric acid, ascorbic acid, malic acid, tartaric acid, lactic acid, acetic acid, gluconic acid, hydroxyacetic acid, oxalic acid, malonic acid, levulinic acid, sulfanilic acid, p-toluenesulfonic acid, phytic acid, organic phosphonic acid, phosphoric acid, nitric acid, sulfuric acid, polyphosphoric acid, and alkali metal salts, alkaline earth metal salts, ammonium salts, and organic amine salts thereof.

* * * * *